United States Patent [19]

Reck et al.

[11] Patent Number: 6,146,746
[45] Date of Patent: Nov. 14, 2000

[54] FORMALDEHYDE-FREE COATING COMPOSITION FOR SHAPED ARTICLES

[75] Inventors: Bernd Reck, Grünstadt; Eckehardt Wistuba, Bad Dürkheim; Wilhelm Friedrich Beckerle, Bobenheim-Roxheim; Axel Kistenmacher; Robert Rupaner, both of Ludwigshafen; Rainer Hummerich, Worms, all of Germany

[73] Assignee: BASF Aktiengesellschaft, Ludwigshafen, Germany

[21] Appl. No.: 09/101,797

[22] PCT Filed: Feb. 19, 1997

[86] PCT No.: PCT/EP97/00773

§ 371 Date: Aug. 19, 1998

§ 102(e) Date: Aug. 19, 1998

[87] PCT Pub. No.: WO97/31060

PCT Pub. Date: Aug. 28, 1997

[30] Foreign Application Priority Data

Feb. 21, 1996 [DE] Germany .................... 196 06 392

[51] Int. Cl.$^7$ .................. B05D 3/02; E04B 1/82; E04B 1/84
[52] U.S. Cl. ............... 428/220; 252/62; 181/284; 181/294; 428/522; 442/120; 427/385.5
[58] Field of Search ................ 427/385.5, 389.8, 427/389.9, 421, 196; 252/62; 181/284, 294; 442/120, 154, 172; 428/337, 522, 219, 220

[56] References Cited

U.S. PATENT DOCUMENTS

| 4,367,259 | 1/1983 | Fulmer et al. ............... 428/240 |
| 5,427,587 | 6/1995 | Arkens et al. ............... 8/116.1 |

FOREIGN PATENT DOCUMENTS

| 0 123 234 | 4/1984 | European Pat. Off. . |
| 0 386 579 | 2/1990 | European Pat. Off. . |
| 0 445 578 | 2/1991 | European Pat. Off. . |
| 0 583 086 | 7/1993 | European Pat. Off. . |
| 0 651 088 | 10/1994 | European Pat. Off. . |

*Primary Examiner*—Shrive Beck
*Assistant Examiner*—Jennifer Calcagni
*Attorney, Agent, or Firm*—Oblon, Spivak, McClelland, Maier & Neustadt, P.C.

[57] ABSTRACT

The use of a formaldehyde-free aqueous binder comprising
A) a polymer obtained by free-radical polymerization comprising 5–100% by weight of an ethylenically unsaturated acid anhydride or of an ethylenically unsaturated dicarboxylic acid whose carboxyl groups may form an anhydride group, and
B) an alkanolamine having at least two hydroxyl groups as a coating composition for shaped articles.

19 Claims, No Drawings

FORMALDEHYDE-FREE COATING COMPOSITION FOR SHAPED ARTICLES

The invention relates to the use of coating compositions for coating shaped articles and sheets.

Shaped articles, for example soundproofing panels, often consist of fibers or fillers which are bound, i.e. consolidated, by means of a binder, for example starch or aqueous polymer dispersions.

Shaped articles or sheets can be coated or impregnated on the surface with a coating composition in order to improve further the properties of the shaped articles or sheets.

In EP 123 234 it is noted that such sheets must frequently be coated or impregnated with formaldehyde condensation resins in order to improve the moisture resistance. A disadvantage of sheets treated in this way, especially in the context of use in enclosed spaces, is the gradual release of formaldehyde from the condensation resin.

EP 386 579 describes shaped articles obtainable by impregnating preforms composed in the main of mineral fibers, nonfibrous mineral fillers and starch with a composition containing a binder comprising copolymers composed of

| | |
|---|---|
| 60–95% by weight | of methyl methacrylate (I) |
| 5–40% by weight | of acrylic and/or methacrylate acid (II) |
| 0–35% by weight | of one or more acrylic esters of a $C_1$–$C_8$-alkanol (III) |
| 0–5% by weight | of copolymerizable polyunsaturated monomers (VI) |
| and | |
| 0–5% by weight | of other copolymerizable monomers (VI) | in polymerized form, the weight percentages of monomers I, II, III and V having been selected within the stated limits in such a way that a polymer composed of these monomers only would have a glass transition temperature of from 60 to 125° C.

The starch-containing sheets impregnated with such compositions, when stored for 48 hours under hot, damp conditions, show unsatisfactory bowing.

EP 445 578 describes binders and coating compositions for sheets, containing at least one high molecular mass polycarboxylic acid and at least one polyfunctional amine or alkanolamine or a polyhydric alcohol. High molecular mass polycarboxylic acids described are polyacrylic acid, poly (methyl methacrylate-co-n-butyl acrylate-co-methacrylic acid) and poly(methyl methacrylate-co-methacrylic acid). Polyfunctional alcohols and alkanolamines used are 2-hydroxymethyl-1,4-butanediol, trimethylolpropane, glycerol, poly(methyl methacrylate-co-hydroxypropyl acrylate), diethanolamine and triethanolamine. Although maleic acid is named as a possible comonomer for preparing the high molecular mass polycarboxylic acids, no more detailed description is given of the use of copolymers containing maleic acid. Preferably, α,β-unsaturated carboxylic acids are used. Although one example cites the use of triethanolamine as crosslinking agent, it is used only in combination with an aqueous dispersion, prepared by emulsion polymerization, of a copolymer of methyl methacrylate and methacrylic acid. A disadvantage is the inadequate flexural modulus of the coated, starch-containing sheets. It is desirable to give the coated sheet a maximum flexural modulus so that no unwanted deformation occurs even in the course of a period of use extending over several years.

EP 583 086 discloses formaldehyde-free aqueous binders for producing mechanically stable, thermally resistant glass fiber nonwovens. The binders contain polycarboxylic acids and polyols. No mention is made of the coating or impregnation of sheets composed of organic and/or inorganic fibers, nonfibrous mineral fillers and starch and/or aqueous polymer dispersions.

EP 651 088 describes a method of consolidating cellulose substrates using aqueous compositions of polycarboxylic acids, polyols and phosphorus-containing accelerators. No mention is made of the coating or impregnation of sheets composed of organic and/or inorganic fibers, nonfibrous mineral fillers and starch and/or aqueous polymer dispersions.

A disadvantage of known sheets and shaped articles comprising organic and/or inorganic fibers and nonfibrous mineral fillers is their excessive bowing under damp and/or hot conditions, especially if starch has been used as binder for the fibers and/or fillers.

It is an object of the present invention, therefore, to provide formaldehyde-free coating and impregnating compositions for sheets of organic and/or inorganic fibers or nonfibrous mineral fillers. The coated or impregnated sheets should possess good mechanical properties, and in particular a high flexural modulus, under hot and damp conditions.

We have found that this object is achieved by the use of a formaldehyde-free aqueous binder comprising A) a polymer obtained by free-radical polymerization comprising 5–100% by weight of an ethylenically unsaturated acid anhydride or of an ethylenically unsaturated dicarboxylic acid whose carboxyl groups may form an anhydride group, and B) an alkanolamine having at least two hydroxyl groups as a coating composition for shaped articles.

The invention additionally provides the coated shaped articles thus obtained.

The aqueous binder includes a polymer A) of which 5–100% by weight, preferably 5–50% by weight, particularly preferably 10–40% by weight, is composed of an ethylenically unsaturated acid anhydride or of an ethylenically unsaturated dicarboxylic acid whose carboxyl groups may form an anhydride group (referred to below as monomers a)).

Preferred acid anhydrides are dicarboxylic anhydrides. Generally suitable ethylenically unsaturated dicarboxylic acids are those having carboxyl groups on adjacent carbons. The carboxyl groups may also be in salt form.

Preferred monomers a) are maleic acid, maleic anhydride, itaconic acid, norbornenedicarboxylic acid, 1,2,3,6-tetrahydrophthalic acid, 1,2,3,6-tetrahydrophthalic anhydride, their alkali metal and ammonium salts, or mixtures thereof. Particular preference is given to maleic acid and maleic anhydride.

In addition to monomers a), the polymer may also include monomers b).

Examples of monomers b) which can be employed are: monoethylenically unsaturated $C_3$–$C_{10}$ monocarboxlyic acids (monomers $b_1$), such as acrylic acid, methacrylic acid, ethylacrylic acid, allylacetic acid, crotonic acid, vinylacetic acid, maleic acid monoesters, such as monomethyl maleate, their mixtures and their alkali metal and ammonium salts; linear 1-olefins, branched-chain 1-olefins or cyclic olefins (monomers $b_2$), such as ethene, propene, butene, isobutene, pentene, cyclopentene, hexene, cyclohexene, octene, 2,4,4-trimethyl-1-pentene, alone or mixed with 2,4,4-trimethyl-2-pentene, $C_8$–$C_{10}$-olefin, 1-dodecene, $C_{12}$–$C_{14}$-olefin, octadecene, 1-eicosene ($C_{20}$), $C_{20}$–$C_{24}$-olefin, double-bond terminated oligoolefins prepared with metallocene catalysis, e.g. oligopropene, oligohexene and oligooctadecene; olefins of high α-olefin content prepared by cationic polymerization, such as polyisobutene;

vinyl and allyl alkyl ethers with 1 to 40 carbons in the alkyl, said alkyl possibly also carrying further substituents such as hydroxyl, amino, dialkylamino or one or more alkoxylate groups (monomers $b_3$), such as methyl vinyl ether, ethyl vinyl ether, propyl vinyl ether, isobutyl vinyl ether, 2-ethylhexyl vinyl ether, vinyl cyclohexyl ether, vinyl-4-hydroxybutyl ether, decyl vinyl ether, dodecyl vinyl ether, octadecyl vinyl ether, 2-(diethylamino)ethyl vinyl ether, 2-(di-n-butyl-amino)ethyl vinyl ether, methyldiglycol vinyl ether, and the corresponding allyl ethers, and mixtures thereof;

acrylamides and alkyl-substituted acrylamides (monomers $b_4$), such as acrylamide, methacrylamide, N-tert-butylacrylamide and N-methyl(meth)acrylamide;

sulfo-containing monomers (monomers $b_5$), such as allylsulfonic acid, methallylsulfonic acid, styrene sulfonate, vinylsulfonic acid, allyloxybenzenesulfonic acid, 2-acrylamido-2-methylpropanesulfonic acid, their corresponding alkali metal or ammonium salts, and mixtures thereof;

$C_1$–$C_8$-alkyl esters or $C_1$–$C_4$-hydroxyalkyl esters of acrylic acid, methacrylic acid or maleic acid, or esters of $C_1$–$C_{18}$-alcohols, alkoxylated with 2–50 mol of ethylene oxide, propylene oxide, butylene oxide or mixtures thereof, with acrylic acid, methacrylic acid or maleic acid (monomers $b_6$), such as methyl (meth)acrylate, ethyl (meth)acrylate, propyl (meth)acrylate, isopropyl (meth)acrylate, butyl (meth) acrylate, hexyl (meth)acrylate, 2-ethylhexyl (meth)acrylate, hydroxyethyl (meth)acrylate, hydroxypropyl (meth) acrylate, 1,4-butanediol monoacrylate, dibutyl maleate, ethyldiglycol acrylate, methylpolyglycol acrylate (11 EO), (meth)acrylic esters of $C_{13}$/$C_{15}$ oxo alcohol reacted with 3, 5, 7, 10 or 30 mol of ethylene oxide, and mixtures thereof;

alkylaminoalkyl (meth)acrylates or alkylaminoalkyl(meth) acrylamides or quaternization products thereof (monomers $b_7$), such as 2-(N,N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammonium-propyl(meth)acrylamide chloride;

vinyl and allyl esters of $C_1$–$C_{30}$-monocarboxylic acids (monomers $b_8$), such as vinyl formate, vinyl acetate, vinyl propionate, vinyl butyrate, vinyl valerate, vinyl 2-ethylhexanoate, vinyl nonanoate, vinyl decanoate, vinyl pivalate, vinyl palmitate, vinyl stearate and vinyl laurate; and, as further monomers $b_9$:

N-vinylformamide, N-vinyl-N-methylformamide, styrene, α-methylstyrene, 3-methylstyrene, butadiene, N-vinylpyrrolidone, N-vinylimidazole, 1-vinyl-2-methylimidazole, 1-vinyl-2-methyl-imidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole, and mixtures thereof.

In addition to monomers a), the polymer may also include 0–95% by weight of monomers b, preferably 50–95% by weight, particularly preferably 60–90% by weight, of these monomers b.

Preferred monomers are acrylic acid, methacrylic acid, ethene, propene, butene, isobutene, cyclopentene, methyl vinyl ether, ethyl vinyl ether, acrylamide, 2-acrylamido-2-methylpropanesulfonic acid, vinyl acetate, styrene, butadiene, acrylonitrile and mixtures thereof.

Particular preference is given to acrylic acid, methacrylic acid, ethene, acrylamide, styrene and acrylonitrile and mixtures thereof.

Very particular preference is given to acrylic acid, methacrylic acid and acrylamide and mixtures thereof.

The polymers can be prepared by customary techniques, for example by bulk, emulsion, suspension, dispersion, precipitation and solution polymerization. These techniques are preferably operated with exclusion of oxygen, preferably in a stream of nitrogen, in each case using the customary apparatus—stirred kettles, cascades of stirred kettles, autoclaves, tubular reactors and kneading apparatus, for example. Preferred techniques are those of solution, emulsion, precipitation or suspension polymerization, with solution and emulsion polymerization being particularly preferred. Polymerization can be carried out in solvents or diluents, for example toluene, o-xylene, p-xylene, cumene, chlorobenzene, ethylbenzene, industrial mixtures of alkyl-aromatic compounds, cyclohexane, industrial mixtures of aliphatics, acetone, cyclohexanone, tetrahydrofuran, dioxane, glycols and glycol derivatives, polyalkylene glycols and their derivatives, diethyl ether, tert-butyl methyl ether, methyl acetate, isopropanol, ethanol, water or mixtures, for example of isopropanol and water. A preferred solvent or diluent is water, which is used with or without proportions of up to 60% by weight of alcohols or glycols. The use of water is particularly preferred.

Polymerization can be carried out at 20–300° C., preferably 60–200° C. Depending on the chosen polymerization conditions, weight-average molecular weights of, for example, from 800 to 5,000,000, in particular from 1000 to 1,000,000, can be established. The weight-average molecular weights $M_w$ are preferably in the range from 2000 to 400,000, $M_w$ being determined by gel permeation chromatography (as described in detail in the examples).

Polymerization preferably takes place in the presence of compounds which form free radicals. Up to 30% by weight of these compounds, preferably from 0.05 to 15% by weight, particularly preferably from 0.2 bis 8% by weight, based on the monomers employed in the polymerization, is required. In the case of multi-component initiator systems (e.g. redox initiator systems), these weight percentages relate to the sum of the components.

Examples of suitable polymerization initiators are peroxides, hydroperoxides, peroxydisulfates, percarbonates, peroxy esters, hydrogen peroxide and azo compounds. Examples of initiators which are soluble or may be insoluble in water are hydrogen peroxide, dibenzoyl peroxide, dicyclohexyl peroxydicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxydisulfates, azodiisobutyronitrile, 2,2'-azobis(2-amidinopropane) dihydrochloride, 2-(carbamoylazo)isobutyronitrile and 4,4-azobis(4-cyanovaleric acid).

The initiators can be used alone or in a mixture of, for example, hydrogen peroxide and sodium peroxydisulfate. For polymerization in an aqueous medium it is preferred to use water-soluble initiators.

The known redox initiator systems can also be used to initiate polymerization. Such redox initiator systems contain at least one peroxide-containing compound in combination with a Redox coinitiator, for example a reductive sulfur compound such as a bisulfite, sulfite, thiosulfate, dithionite or tetrathionate of alkali metals and ammonium compounds. Thus it is possible to employ combinations of peroxodisulfates with alkali metal hydrogen sulfites or ammonium hydrogen sulfites, for example ammonium peroxydisulfate and ammonium disulfite. The ratio of peroxide-containing compound to redox coinitiator is from 30:1 to 0.05:1.

In combination with the initiators and/or redox initiator systems it is possible to use, in addition, transition metal catlysts such as salts or iron, cobalt, nickel, copper, vanadium and manganese. Examples of suitable salts are iron(II) sulfate, cobalt(II) chloride, nickel(II) sulfate and copper(I) chloride. Based on monomers, the reductive transition metal salt is used in a concentration of 0.1–1,000 ppm. Thus it is possible to use combinations of hydrogen peroxide with iron(II) salts, for example 0.5–30% hydrogen peroxide and 0.1–500 ppm of Mohr's salt.

Polymerization in organic solvents can also be carried out using, in combination with the abovementioned initiators, redox coinitiators and/or transition metal catalysts, examples being benzoin, dimethylaniline, ascorbic acid and organic-soluble complexes of heavy metals such as copper, cobalt, iron, manganese, nickel and chromium. The amounts of redox coinitiators or transition metal catalysts usually used in this case are about 0.1–1000 ppm, based on the monomer quantities employed.

If the reaction mixture is initially polymerized partly at the lower limit of the temperature range appropriate for polymerization and is then polymerized to completion at a higher temperature, it is expedient to use at least two different initiators which decompose at different temperatures, so that there is a sufficient concentration of free radicals available within each temperature range.

To prepare polymers of low average molecular weight, it is often expedient to carry out copolymerization in the presence of regulators. For this purpose, customary regulators can be used, for example organic compounds containing SH groups, such as 2-mercaptoethanol, 2-mercaptopropanol, mercaptoacetic acid, tert-butylmercaptan, n-octylmercaptan, n-dodecylmercaptan and tert-dodecylmercaptan, $C_1$–$C_4$-aldehydes, such as formaldehyde, acetaldehyde, propionaldehyde, hydroxylammonium salts, such as hydroxylammonium sulfate, formic acid, sodium bisulfite or isopropanol. These regulators are generally used in amounts of 0.1–10% by weight relative to the monomers. The average molecular weight can also be influenced through the choice of appropriate solvent. For instance, polymerization in the presence of diluents containing benzylic hydrogens leads to a decrease in the average molecular weight as a result of chain transfer.

To prepare copolymers of higher molecular mass, it is often expedient to operate in the presence of crosslinking agents during polymerization. These are compounds containing two or more ethylenically unsaturated groups, examples being diacrylates or dimethacrylates of at least dihydric, saturated alcohols, such as ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. The acrylates and methacrylates of alcohols having more than 2 OH groups can also be used as crosslinking agents, examples being trimethylolpropane triacrylate and trimethylolpropane trimethacrylate. A further class of crosslinking agents includes diacrylates or dimethacrylates of polyethylene glycols or polypropylene glycols having molecular weights in each case of 200–9,000. Polyethylene glycols or polypropylene glycols which can be used to prepare the diacrylates or dimethacrylates preferably have a molecular weight of in each case 400–2,000. Apart from the homopolymers of ethylene oxide or propylene oxide it is also possible to use block copolymers of ethylene oxide and propylene oxide or copolymers of ethylene oxide and propylene oxide in which the EO and PO units are distributed at random. Ethylene oxide and propylene oxide oligomers are also suitable for preparing the crosslinking agents, examples being diethylene glycol diacrylate, diethylene glycol dimethacrylate, triethylene glycol diacrylate, triethylene glycol dimethacrylate, tetraethylene glycol diacrylate and tetraethylene glycol dimethacrylate.

Other suitable crosslinking agents are vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, methylenebis(meth) acrylamide, divinylethyleneurea, divinylpropyleneurea, divinylbenzene, divinyldioxane, triallyl cyanurate, tetraallylsilane, tetravinylsilane and bisacrylic or polyacrylic siloxanes (e.g. Tegomers® from Th. Goldschmidt AG). The crosslinking agents are employed preferably in amounts from 10 ppm to 5% by weight, based on the monomers to be polymerized.

In the case of emulsion, precipitation, suspension or dispersion polymerization, it may be advantageous to stabilize the polymer droplets or polymer particles using surface-active auxiliaries. To this end it is common to use emulsifiers or protective colloids. Suitable emulsifiers are anionic, nonionic, cationic and amphoteric types, examples of the former being alkylbenzenesulfonic acids, sulfonated fatty acids, sulfosuccinates, fatty alcohol sulfates, alkylphenol sulfates and fatty alcohol ether sulfates. Examples of nonionic emulsifiers for possible use are alkylphenol ethoxylates, primary alcohol ethoxylates, fatty acid ethoxylates, alkanolamide ethoxylates, fatty amine ethoxylates, EO/PO block copolymers and alkyl polyglucosides. Examples of cationic and amphoteric emulsifiers used are quaternized amine alkoxylates, alkyl betaines, alkylamido betaines and sulfobetaines.

Examples of typical protective colloids are cellulose derivatives, polyethylene glycol, polypropylene glycol, ethylene glycolpropylene glycol copolymers, polyvinyl acetate, polyvinyl alcohol, polyvinyl ethers, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid- and/or maleic anhydride-containing copolymers as described, for example, in DE 2 501 123.

The emulsifiers or protective colloids are usually used in concentrations of 0.05–20% by weight, based on the monomers.

In the case of polymerization in aqueous solution or dilution, the monomers can be partially or totally neutralized by means of bases prior to or during the polymerization. Examples of possible bases are alkali metal or alkaline earth metal compounds, such as sodium hydroxide, potassium hydroxide, calcium hydroxide, magnesium oxide, sodium carbonate; ammonia; primary, secondary and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine or morpholine.

Furthermore, it is also possible to employ polybasic amines for the neutralization, such as ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine or polyvinylamine.

For partial or complete neutralization of the ethylenically unsaturated carboxylic acids prior to or during polymerization it is preferred to use ammonia, triethanolamine and diethanolamine.

It is particularly preferred not to neutralize the ethylenically unsaturated carboxylic acids prior to or during polymerization. Preferably, even after polymerization no neutralizing agent is added, apart from the alkanolamine B). The polymerization can be carried out in accordance with a host of variants, continuously or batchwise. It is usual to charge a portion of the monomers to the reaction vessel, if desired in an appropriate diluent or solvent and in the presence or absence of an emulsifier, a protective colloid or further auxiliaries, to render this initial charge inert, and to raise the temperature until it reaches the level desired for polymerization. However, it is also possible to use only an appropriate diluent as the initial charge. The free-radical initiator, further monomers and other auxiliaries, for example regulators or crosslinking agents, in each case optionally in a diluent, are then metered in over a defined period of time, these feed times possibly being of different length. For example, a longer feed time can be chosen for the initiator feed than for the monomer feed.

If the polymer is obtained by solution polymerization in water, then it is normally unnecessary to separate off the solvent. If it is nevertheless desired to isolate the polymer, this can be done by, for example, spray drying.

If the polymer is prepared by the method of solution, precipitation or suspension polymerization in a steam-volatile solvent or solvent mixture, then steam can be introduced in order to separate off the solvent so as to obtain an aqueous solution or dispersion. The polymer can also be separated from the organic diluent using a drying process.

The polymers A) are preferably in the form of an aqueous dispersion or solution with a solids content of 10–80% by weight, especially 40–65% by weight.

Polymer A) can also be obtained by grafting maleic acid and/or maleic anhydride, or a monomer mixture containing maleic acid or maleic anhydride, onto a graft base. Suitable examples of the latter are monosaccharides, oligosaccharides, modified polysaccharides and alkyl polyglycol ethers. Graft polymers of this kind are described in, for example, DE 4 003 172 and EP 116 930.

As component B), alkanolamines having at least two OH groups are used, preferably alkanolamines of the formula

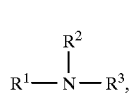

I in which $R^1$ is hydrogen, $C_1-C_{10}$-alkyl or $C_1-C_{10}$-hydroxyalkyl and $R^2$ and $R^3$ are $C_1-C_{10}$-hydroxyalkyl.

With particular preference, $R^2$ and $R^3$ are each independently $C_2-C_5$-hydroxyalkyl and $R^1$ is hydrogen, $C_1-C_5$-alkyl or $C_2-C_5$-hydroxyalkyl.

Examples of compounds of the formula I are diethanolamine, triethanolamine, diisopropanolamine, triisopropanolamine, methyldiethanolamine, butyldiethanolamine and methyldiisopropanolamine, with triethanolamine being particularly preferred.

To prepare the formaldehyde-free binders the polymer A) and the alkanolamine B) are preferably used in mutual proportions such that the molar ratio between carboxyls of component A) and hydroxyls of component B) is from 20:1 to 1:1, preferably from 8:1 to 5:1 and, with particular preference, from 5:1 to 1.7:1 (in this case the anhydride groups are calculated as two carboxyls).

The formaldehyde-free aqueous binders are prepared simply, for example, by adding the alkanolamine to the aqueous dispersion or solution of the polymers A).

The novel binders preferably contain less than 1.5% by weight, especially less than 1.0% by weight, particularly preferably less than 0.5% by weight and, with very particular preference, less than 0.3% by weight, in particular less than 0.1% by weight, based on the sum of A)+B), of a phosphorus-containing reaction accelerator. Such accelerators are specified in U.S. Pat. No. 651,088 and U.S. Pat. No. 583,086, and are, in particular, alkali metal hypophosphites, phosphites, polyphosphates and dihydrogen phosphates, polyphosphoric acid, hypophosphoric acid, phosphoric acid, alkylphosphinic acid or oligomers or polymers of these salts and acids.

The binders preferably contain no phosphorus-containing reaction accelerator, i.e. no reaction-accelerating amounts of a phosphorus-containing compound. The novel binders may contain an esterification catalyst, for example sulfuric or p-toluenesulfonic acid. The novel binders can be used as impregnating or coating compositions, and may constitute the sole constituent of such compostions. The impregnating or coating compositions may also, however, include other additives suitable for the particular intended use. Suitable examples are dies, pigments, fillers, flameproofing agents, hydrophobicizing agents, biocides, plasticizers, thickeners, adhesion promoters, reducing agents and transesterification catalysts.

The novel binders have a gel content, after drying (50° C. for 72 hours) to form a film with a thickness of 0.3–1 mm and then curing at 130° C. for 15 minutes in air, of preferably more than 50% by weight, particularly preferably more than 60% by weight and, with very particular preference, more than 70% by weight.

After the end of curing, the cured films are stored in water at 23° C. for 48 hours. After their removal, soluble fractions remain in the water. The film is then dried at 50° C. to constant weight and weighed, this weight corresponding to the gel content in % by weight, based on the weight prior to separation of the volatile constituents. Weight constancy is reached when the decrease in weight over a period of 3 hours is less than 0.5%, in particular less than 0.1%.

The formaldehyde-free aqueous binders are used as coating compositions or impregnating compositions (referred to collectively as coating compositions) for shaped articles.

These shaped articles may in particular be sheets or panels, preferably with a thickness of 5–100 mm, particularly preferably 5–30 mm and very particularly preferably 10–25 mm. The length of such panels is typically from 200 to 2000 mm along the edges.

The panels are, in particular, soundproofing panels.

The shaped articles, sheets or panels preferably consist of organic or inorganic fibers or mineral fillers, the fibers and/or fillers being consolidated with a polymer binder.

Fibers which may be mentioned in particular are inorganic fibers, for example mineral fibers, glass fibers and rock wool, and also organic fibers, for example wood fibers or cellulose fibers produced from waste paper.

Fillers which may be mentioned include perlite and clay.

Examples of polymer binders are phenol-formaldehyde resins, polymer dispersions and starch.

In addition to the constituents mentioned the panels may also contain customary flameproofing agents, for example aluminum silicates and aluminum hydroxides, borates and/or phosphates.

Finally, when preparing the panels it is common to add customary hydrophobicizing agents, such as silicones (polysiloxanes) and/or waxes.

Methods of preparing such panels are generally known. They normally involve, for example, preparing an aqueous suspension of the constituents, dewatering the suspension using a long sieve, and then carrying out drying.

When used as coating compositions for shaped articles, the formaldehyde-free binders may additionally contain auxiliaries which are customary in coating and impregnation technology, examples being finely divided inert fillers such as aluminum silicates, quartz, precipitated or pyrogenic silica, fluorspar and heavy spar, talc, dolomite or calcium carbonate, coloring pigments such as titanium white, zinc white, iron oxide black, etc., foam inhibitors, for example modified dimethylpolysiloxanes, adhesion promoters and preservatives. The amounts of these additives which it is appropriate to use are familiar to the skilled worker and are selected in each individual case in accordance with the desired properties of the particular composition.

Based on the overall weight of the coating composition, the proportion of formaldehyde-free binder (calculated as A)+B)) is 1–65% by weight, the proportion of inert fillers is 0–85% by weight and the proportion of water is at least 10% by weight.

The coating compositions are advantageously prepared by stirring any additives to be used into a 5–65% strength aqueous solution or dispersion of the binder.

The coating compositions can be applied by spraying, rolling or pouring. The amounts applied, based on the formaldehyde-free binder (calculated as the sum of A)+B)), is generally 2–300, preferably 2–100, g/m$^2$. The shaped articles or panels can be coated on all sides, a number of sides or just one side. In the case of panels, especially soundproofing panels, coating preferably takes place on both sides.

The coated shaped articles are dried at 100–300° C., preferably at 150–250° C., and the coatings are cured.

The coated shaped articles have very good mechanical properties, especially a good flexural strength under dry and damp conditions.

The coating compositions bring about an improvement in the mechanical properties, and especially in the rigidity even under hot and damp conditions. This improvement occurs in a particularly marked manner with shaped articles which when uncoated have poor mechanical properties.

EXAMPLES

Abbreviations:

AA: acrylic acid

MA: maleic acid

Coating composition A:

200 g of an aqueous solution of an 80 AA/20 MA copolymer (solids content 44.5%, pH 0.8; $M_w$ 160,000) are mixed with 18 g of triethanolamine.

pH: 3.7

Viscosity: 7900 mPas (at 250 s$^{-1}$ in a Contraves Rheomat, DIN measurement system 108).

Active constituents: 49.0% by weight (active constituents are all ingredients except for water).

Gel fraction:

A proportion of the mixture which is calculated so that the thickness of the resulting film is from about 0.3 to 0.7 mm is poured into a silicone mold (15×7×0.5 cm) and dried at 50° C. for 72 hours to give such a film.

About 1 g of this film is cured in air at 130° C. for 15 minutes, and the cured film is stored at 23° C. in distilled water for 48 h.

The gel fraction is calculated from the weight of the film which has been stored in water and has then been dried to constant weight in relation to the original weight of the film. In this example this fraction is 83%.

Coating composition B:

200 g of an aqueous solution of a 55 AA/45 MA copolymer (solids content 50.0%, pH 1.0; $M_w$ 3000, K value in water=20) are mixed with 30 g of triethanolamine.

pH: 3.4

Viscosity: 580 mPas

Active constituents: 58.8% by weight

Gel fraction: 55%

Coating composition C:

A mixture is prepared from 200 g of water, 36 g of polyacrylic acid (K value of the sodium salt in water at 25° C.=110), 6.2 g of glycerol and 7.4 g of trimethylolpropane.

pH: 2.3

Viscosity: 26 mPas

Active constituents: 20% by weight

Coating and testing of mineral fiberboards:

A commercially available soundproofing panel with a thickness of 16 mm, containing starch as binder, was coated on the decoration side, using a brush, with the coating compositions indicated in the table below. The application rate in each case was 100 g of 25 active constituents/m$^2$. The panels were dried at 200° C. for 15 minutes.

The modulus of elasticity Eb of the uncoated and coated panels was tested in accordance with DIN 53362 at 23° C. and at 60° C. The dimensions of the test panels were 25×5×1.6 cm.

| | Test Results: | | |
|---|---|---|---|
| Example | Coating composition | $E_b$ at 23° C. N/mm$^2$ | $E_b$ at 60° C. N/mm$^2$ |
| 1 | none | 240 | 235 |
| 2 | A | 400 | 390 |
| 3 | B | 390 | 375 |
| 4 | C | 370 | 280 |

What is claimed is:

1. A process for preparing a coated panel having a thickness of 5–100 mm which panel is characterized by organic or inorganic fibers or mineral fillers which are consolidated with a polymer binder, which process comprises coating the panel with a coating composition containing a formaldehyde-free aqueous binder composition comprising:
   A) a polymer obtained by free-radical polymerization comprising 5–100% by weight of an ethylenically unsaturated acid anhydride or of an ethylenically unsaturated dicarboxylic acid whose carboxyl groups may form an anhydride group, and
   B) an alkanolamine having at least two hydroxyl groups as a coating composition and thereafter drying the coated panels.

2. A process as claimed in claim 1, where the panels are sound-proofing panels.

3. A process as claimed in claim 1, where the formaldehyde-free binder is applied at a rate of 2–300 g, calculated as the sum of A)+B), per m² to at least one surface of the panel.

4. A process as claimed in claim 1, where the formaldehyde-free binder contains less than 1.5% by weight, based on the sum of A)+B), of a phosphorous-containing reaction accelerator.

5. A process as claimed in claim 1, where from 5 to 100% by weight of the polymer A) is composed of maleic acid or maleic anhydride.

6. A process as claimed in claim 1, where the alkanolamine is a compound represented by the formula (I):

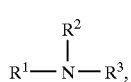

wherein
$R^1$ is hydrogen, $C_1$–$C_{10}$-alkyl or $C_1$–$C_{10}$-hydroxyalkyl, and
$R^2$ and $R^3$ are $C_1$–$C_{10}$-hydroxyalkyl.

7. A process as claimed in claim 1, where the alkanolamine is triethanolamine.

8. A process as claimed in claim 1, where the molar ratio of the carboxyls and acid anhydride groups (1 acid anhydride group being calculated as two carboxyls) of A) to the hydroxyls of B) is 20:1 to 1:1.

9. A process as claimed in claim 1, where the formaldehyde-free binder has a gel content of more than 50% by weight after drying at 50° C. for 72 hours to a film of from 0.3 to 1 mm in thickness and then curing at 130° C. in air.

10. A coated panel obtained by the process as claimed in claim 1.

11. The process of claim 1, wherein the polymer binder which consolidates the organic or inorganic fibers or mineral fibers of the panel is starch.

12. A coated panel obtained by the process of claim 11.

13. The process of claim 11, wherein components of the coating composition is an acrylic acid-maleic acid copolymer.

14. A coated panel obtained by the process of claim 13.

15. A coated panel obtained by the process of claim 8.

16. The process of claim 8, wherein the polymer binder which consolidates the organic or inorganic fibers or mineral fibers of the panel is starch.

17. A coated panel obtained by the process of claim 16.

18. The process of claim 11, wherein the component (A) of the coating composition is an acrylic acid-maleic acid copolymer.

19. A coated panel obtained by the process of claim 18.

* * * * *